United States Patent [19]

Reilly et al.

[11] Patent Number: 5,244,750

[45] Date of Patent: Sep. 14, 1993

[54] COATED ELECTROLUMINESCENT PHOSPHOR

[75] Inventors: Kenneth T. Reilly, Towanda, Pa.; Andrew G. Sigai, Lexington, Mass.

[73] Assignee: GTE Products Corporation, Stamford, Conn.

[21] Appl. No.: 778,766

[22] Filed: Oct. 21, 1991

Related U.S. Application Data

[63] Continuation of Ser. No. 532,155, Jun. 1, 1990, abandoned, which is a continuation of Ser. No. 204,810, Jun. 10, 1988, abandoned.

[51] Int. Cl.$^5$ .............................................. H05B 33/00
[52] U.S. Cl. ..................................... 428/690; 428/917; 428/403; 252/301.6 R; 250/483.1; 250/484.2; 313/503; 313/506
[58] Field of Search ............... 428/690, 917, 403; 252/301.6 R; 250/483.1, 484.1; 313/503, 506

[56] References Cited

U.S. PATENT DOCUMENTS

| | | | |
|---|---|---|---|
| 2,908,588 | 10/1959 | Harper | 427/64 |
| 3,232,781 | 2/1966 | McGee | 428/917 |
| 4,152,483 | 5/1979 | Kanda | 427/68 |
| 4,242,370 | 12/1980 | Abdalla | 427/64 |
| 4,263,339 | 4/1981 | Fischer | 427/64 |
| 4,279,726 | 7/1981 | Baird | 204/192.26 |
| 4,287,229 | 9/1981 | Watanabe | 427/64 |
| 4,307,320 | 12/1981 | Kotera | 427/64 |
| 4,365,184 | 12/1982 | Higton | 427/64 |
| 4,377,769 | 3/1983 | Beatty | 313/495 |
| 4,552,782 | 11/1985 | Cattell | 427/64 |
| 4,670,688 | 6/1987 | Sigai | 313/489 |
| 4,681,807 | 7/1987 | Schulze | 428/403 |
| 4,684,353 | 8/1987 | de Souza | 156/289 |
| 4,710,674 | 12/1987 | Sigai | 427/67 |
| 4,803,400 | 2/1989 | Peters et al. | 313/489 |
| 4,826,727 | 5/1989 | Glaser | 428/403 |

FOREIGN PATENT DOCUMENTS 2004779 1/1987 Japan .................................. 428/403

Primary Examiner—George F. Lesmes
Assistant Examiner—Charles R. Nold
Attorney, Agent, or Firm—Elizabeth A. Levy

[57] ABSTRACT

A coated electroluminescent phosphor which can be copper activated zinc sulfide, copper and manganese activated zinc sulfide or copper activated zinc sulfide-selenide is disclosed having a particle size of from less than about 5 micrometers in diameter to about 80 micrometers in diameter. The coating is from about 100 to about 400 angstroms in thickness, and consists essentially of aluminum oxide and is resistant to moisture and relatively chemically inert.

9 Claims, No Drawings

COATED ELECTROLUMINESCENT PHOSPHOR

This is a continuation of copending application Ser. No. 07/532,155, filed on Jun. 1, 1990, now abandoned which is a continuation application of prior application Ser. No. 07/204,810, filed on Jun. 10, 1988, now abandoned.

BACKGROUND OF THE INVENTION

This invention relates to coated electroluminescent phosphors which are resistant to moisture and are relatively chemically inert. More particularly, the phosphors are coated with an aluminum oxide coating which is non-particulate and conformational in nature.

The electroluminescence of powdered zinc sulfide phosphors embedded in an insulating medium and excited by an alternating electric field usually deteriorates from initial brightness in a near hyperbolical curve. Half life is reached when the brightness versus time curve crosses a horizontal line drawn at half the initial brightness.

Deterioration in zinc sulfide electroluminescent phosphors is thought to occur because of a diffusion of copper from the defects which permeate the zinc sulfide crystals. This diffusion causes an increase in electrical resistance along the imperfection lines and a resulting decrease in brightness.

The diffusion of copper occurs because of the presence of sulfide ion vacancies generated by an electrolytic decomposition of the zinc sulfide surface in the presence of water and an electric field.

To increase the half-life of electroluminescent phosphors it is necessary to impede the diffusivity of the copper atoms.

SUMMARY OF THE INVENTION

In accordance with one aspect of the invention, there is provided a coated electroluminescent phosphor which can be copper activated zinc sulfide, copper and manganese activated zinc sulfide or copper activated zinc sulfide-selenide having a particle size of from less than about 5 micrometers in diameter to about 80 micrometers in diameter. The coating is from about 100 to about 400 angstroms in thickness, and consists essentially of aluminum oxide and is resistant to moisture and relatively chemically inert.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The coated phosphors of the present invention are electroluminescent phosphors having a particle size of from less than about 5 micrometers in diameter to about 80 micrometers in diameter. The most typical phosphors are copper activated zinc sulfide, copper and manganese activated zinc sulfide, and copper activated zinc sulfide-zinc selenide phosphors.

The coating is of aluminum oxide and is usually from about 100 to about 400 angstroms in thickness. The coating thickness is derived in a similar manner as described in U.S. Pat. No. 4,585,673.

The coating imparts moisture resistance and relative chemical inertness to the phosphor. The advantage of the invention is that lamp devices with the coated electroluminescent phosphor have increased usable life.

The method of coating the phosphor is disclosed and claimed in U.S. Pat. No. 4,585,673. That patent is herein incorporated by reference.

U.S. Pat. No. 4,585,673 relates to a method for applying a continuous protective coating to the surface of individual phosphor particles. The method involves chemical vapor deposition of the protective coating on individual particles of a phosphor powder while the phosphor particles are suspended in a fluidized bed. During the method, the fluidized particles are exposed to the vaporized coating precursor material at a first temperature, which is less than the decomposition temperature of the precursor material, and the precursor material is reacted to from the desired coating material at a second temperature, which is greater than or equal to the temperature at which the precursor material reacts to form the coating material.

The precursor materials for the aluminum oxide coating are as described in U.S. Pat. No. 4,585,673.

The coating is of a non-particulate nature and of a conformational nature. Conformational means that the submicron features of the phosphor particle under the high resolution scanning electron microscopy are replicated. The coating has the same physical characteristics as described in U.S. Pat. No. 4,585,673.

To more fully illustrate this invention, the following non-limiting example is presented.

Example

In order to show the resistance of the coated phosphor of the present invention to moisture and chemical deterioration, the following tests are performed on coated zinc sulfide phosphors and uncoated phosphors for purposes of comparison.

About 10 g of the phosphor is placed in a 30 cc glass bottle with a plastic cap. About 4 drops of a $H_2O/HCl$ solution are mixed into the phosphor in different acid strengths. A piece of lead acetate paper is folded into a "W" and suspended above the phosphor. The paper is moistened with about 2 drops of water. The container is sealed with the cap and the jar is covered with aluminum foil and allowed to stand for about 24 hours at room temperature. If $H_2S$ is evolved, the lead acetate paper turns black to some degree.

In the following tests, about 4 drops of the following $H_2O:HCl$ solution (drops:drops) are added to about 10 g of the uncoated phosphor. The lead acetate paper is moistened with about 2 drops of water.

| # | | |
|---|---|---|
| 1 | 50:1 | Black even on outside of bottle after 24 hrs. |
| 2 | 100:1 | Black only on inside of bottle after 24 hrs. |
| 3 | 200:1 | Brown after 24 hrs. |
| 4 | 400:1 | White after 24 hrs. |

The following tests are done on the coated phosphor of the present invention: About 10 g of phosphor is used. About 4 drops of acid solution (drop:drop) is used. Lead acetate paper is moistened with 2 drops of water.

| | | |
|---|---|---|
| 5 | 10:1 | Light brown after 24 hrs. |

-continued

| | | |
|---|---|---|
| 6 | 50:1 | White after 24 hrs. |
| 7 | 100:1 | White after 24 hrs. |
| 8 | 200:1 | White after 24 hrs. |
| 9 | 400:1 | White after 24 hrs. |

It can be seen that the coated phosphor of the present invention shows greater resistance to chemical deterioration as shown by the white to light color of the phosphor when it is in contact with corrosive acid solution, as opposed to the uncoated phosphors which turn black indicating chemical deterioration on contact with acid.

Since the coated phosphor is resistant to chemical deterioration, it is reasonable to assume that the coated phosphor is resistant to moisture. To further prove that the coated phosphor is resistant to moisture, the materials are used in fabrication of test lamps. The following data is presented for lamps with the coated phosphor of the present invention versus the same phosphor in the uncoated state.

| Phosphor | Half-life * @ 50° C.-30% RH 100 V/400 HZ | Half-life * @ 70° C.-90% RH 100 V/400 HZ |
|---|---|---|
| Uncoated phosphor | 220 | 50 |
| Coated phosphor | 420 | 130 |

It can be seen that the coated phosphor has longer life characteristics that the uncoated phosphor. The reason for this improved life is its moisture resistance.

* Half-life is defined as the time required to reach half initial brightness, in hours.

While there has been shown and described what are at present considered the preferred embodiments of the invention, it will be obvious to those skilled in the art that various changes and modifications may be made therein without departing from the scope of the invention as defined by the appended claims.

What is claimed is:

1. An electroluminescent lamp comprising particles of an electroluminescent phosphor, the individual particles of said electroluminescent phosphor being coated with a continuous, non-particulate, conformational coating consisting essentially of aluminum oxide, said coating being structured so as to increase the half-life of said electroluminescent lamp by at least about 90% when compared to an electroluminescent lamp comprising the same phosphor particles but without said continuous, non-particulate, conformational coating.

2. An electroluminescent lamp according to claim 1 wherein said electroluminescent phosphor is copper-activated zinc sulfide.

3. An electroluminescent lamp according to claim 1 wherein said electroluminescent phosphor is copper- and manganese-activated zinc sulfide.

4. An electroluminescent lamp according to claim 1 wherein said electroluminescent phosphor is copper-activated zinc sulfide-zinc selenide.

5. An electroluminescent lamp according to claim 1 wherein said continuous, non-particulate, conformational coating has a thickness of about 100 to 400 Angstroms.

6. An electroluminescent lamp according to claim 1 wherein the particle size of said electroluminescent phosphor is between about 5 and 80 micrometers.

7. An electroluminescent lamp according to claim 1 wherein said half-life of said electroluminescent lamp is measured at 100 volts and 400 Hertz.

8. An electroluminescent lamp according to claim 7 wherein said half-life of said electroluminescent lamp is measured at a temperature of 50° C. and a relative humidity of 30%.

9. An electroluminescent lamp according to claim 7 wherein said half-life of said electroluminescent lamp is measured at a temperature of 70° C. and a relative humidity of 90%.

* * * * *